(12) United States Patent
Kasahara et al.

(10) Patent No.: US 9,846,292 B2
(45) Date of Patent: Dec. 19, 2017

(54) COATED OPTICAL FIBER, OPTICAL FIBER RIBBON, AND OPTICAL CABLE

(71) Applicant: Furukawa Electric Co., Ltd., Tokyo (JP)

(72) Inventors: Minoru Kasahara, Tokyo (JP); Minoru Saito, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/296,003

(22) Filed: Jun. 4, 2014

(65) Prior Publication Data

US 2015/0293325 A1    Oct. 15, 2015

Related U.S. Application Data

(63) Continuation of application No. PCT/JP2012/008037, filed on Dec. 17, 2012.

(30) Foreign Application Priority Data

Feb. 17, 2012    (JP) .................................. 2012-033088

(51) Int. Cl.
*G02B 6/44* (2006.01)
*G02B 6/02* (2006.01)

(52) U.S. Cl.
CPC ....... *G02B 6/4494* (2013.01); *G02B 6/02395* (2013.01); *G02B 6/4403* (2013.01); *G02B 6/4404* (2013.01)

(58) Field of Classification Search
None
See application file for complete search history.

(56) References Cited

U.S. PATENT DOCUMENTS 7,555,183 B2    6/2009    Arashitani et al.
7,729,564 B2    6/2010    Nakajima et al.
(Continued)

FOREIGN PATENT DOCUMENTS

CN    2869902 Y    2/2007
CN    101228468 A    7/2008
(Continued)

OTHER PUBLICATIONS

Saito et al., translation of JP 2004-054138, Feb. 19, 2004.*
(Continued)

*Primary Examiner* — Chris Chu
(74) *Attorney, Agent, or Firm* — Oblon, McClelland, Maier & Neustadt, L.L.P.

(57) ABSTRACT

The purpose of the present invention is to provide, by a configuration or method different from conventional art, a coated optical fiber enabling reduced interface delamination between a glass fiber and a primary coating layer when the coated optical fiber is immersed in water, and a reduction of transmission loss increase. A coated optical fiber according to one embodiment of the present invention is provided with a glass fiber, a primary coating layer coated on the glass fiber, a secondary coating layer coated on the primary coating layer, and a colored layer coated on the secondary coating layer. The coated optical fiber is configured so that small water bubbles are generated substantially evenly within the primary coating layer when the coated optical fiber is immersed for 200 days in warm water of 60° C.

14 Claims, 3 Drawing Sheets

(56) References Cited

U.S. PATENT DOCUMENTS

| | | | |
|---|---|---|---|
| 7,978,948 | B2 | 7/2011 | Nakajima et al. |
| 8,111,964 | B2 | 2/2012 | Nakajima et al. |
| 8,184,937 | B2 | 5/2012 | Sakabe et al. |
| 8,571,372 | B2 | 10/2013 | Nakajima et al. |
| 8,639,077 | B2 | 1/2014 | Tanaka et al. |
| 8,658,257 | B2 | 2/2014 | Kuraseko et al. |
| 8,693,832 | B2 | 4/2014 | Nakamura et al. |
| 8,731,365 | B1 | 5/2014 | Nakajima et al. |
| 2009/0022461 | A1* | 1/2009 | Nakajima ........ G02B 6/02395 385/114 |
| 2009/0052847 | A1 | 2/2009 | Arashitani et al. |
| 2010/0046900 | A1* | 2/2010 | Nakajima ........ C03C 25/1065 385/128 |
| 2010/0119198 | A1* | 5/2010 | Nakajima ........ C03C 25/1065 385/114 |
| 2010/0266257 | A1 | 10/2010 | Nakajima et al. |
| 2010/0322572 | A1 | 12/2010 | Sakabe et al. |
| 2011/0274396 | A1 | 11/2011 | Nakajima et al. |
| 2012/0189257 | A1 | 7/2012 | Kasahara et al. |
| 2013/0315545 | A1 | 11/2013 | Saito et al. |
| 2014/0226941 | A1 | 8/2014 | Tanaka et al. |

FOREIGN PATENT DOCUMENTS

| | | |
|---|---|---|
| CN | 101463114 A | 6/2009 |
| JP | 6-109955 A | 4/1994 |
| JP | 6-128525 A | 5/1994 |
| JP | 2004-054138 A | 2/2004 |
| JP | 2008-040369 A | 2/2008 |
| JP | 2008-197258 A | 8/2008 |
| JP | 2010-217800 A | 9/2010 |

OTHER PUBLICATIONS

International Search Report mailed Mar. 19, 2013 for PCT/JP2012/008037 filed on Dec. 17, 2012 with English Translation.
International Written Opinion mailed Mar. 19, 2013 for PCT/JP2012/008037 filed on Dec. 17, 2012.
U.S. Appl. No. 14/309,380, filed Jun. 19, 2014, Tanaka, et al.
Charles Aloisio, et al., "Optical Fiber Coating Delamination Using Model Coating Materials" Proceedings of the $51^{st}$ IWCS, 2002, pp. 738-747.
Combined Office Action and Search Report issued Jan. 18, 2017 in Chinese Patent Application No. 201280069889.8 (with English translation).

* cited by examiner

COATED OPTICAL FIBER, OPTICAL FIBER RIBBON, AND OPTICAL CABLE

CROSS-REFERENCES TO RELATED APPLICATIONS

This application is a continuation application of International Application No. PCT/JP2012/008037, filed Dec. 17, 2012, which claims the benefit of Japanese Patent Application No. 2012-033088, filed Feb. 17, 2012. The contents of the aforementioned applications are incorporated herein by reference in their entireties.

TECHNICAL FIELD

The present invention relates to a coated optical fiber, an optical fiber ribbon, and an optical cable having excellent water resistance.

BACKGROUND ART

With the recent demand for large-capacity communication, optical fibers have been installed in wide areas. An example of a coated optical fiber used for such an optical fiber includes: a glass fiber; a primary coating layer coating an outer periphery of the glass fiber; a secondary coating layer coating an outer periphery of the primary coating layer; and a colored layer coating an outer periphery of the secondary coating layer.

When a coated optical fiber having such a structure is immersed in water, particularly, in hot water for a long period, the following problem is known to occur in some cases. Specifically, water bubbles are generated in the primary coating layer, and peeling occurs at an interface between the glass fiber and the primary coating layer (the interface being referred to also as a glass/primary interface), so that the transmission loss increases as compared with that before the immersion in water.

To solve this problem, various attempts have been made conventionally. For example, Patent Document 1 discloses that suppression of generation of large water bubbles during immersion in hot water and reduction of the increase in transmission loss are achieved by using, as a primary coating layer, a material having a peeling force adjusted to a predetermined value. Here, the peeling force is measured as follows. First, a glass plate is coated with the material used as the primary coating layer of the coated optical fiber and immersed in hot water. Then, the peeling force for peeling the material from the glass plate at an angle of 90 degrees is measured.

Meanwhile, Patent Document 2 discloses that suppression of generation of large water bubbles during immersion in hot water and reduction of the increase in transmission loss are achieved by adjusting the glass transition temperatures of a primary coating layer and a secondary coating layer of a coated optical fiber to predetermined values, respectively.

CITATION LIST

Patent Documents

Patent Document 1: Japanese Patent Application Laid-Open No. 2004-54138
Patent Document 2: Japanese Patent Application Laid-Open No. 2008-40369
Patent Document 3: Japanese Patent Application Laid-Open No. 2010-217800

Non Patent Document

Non Patent Document 1: Charles Aloisio et al., "Optical Fiber Coating Delamination Using Model Coating Materials", Proceedings of the 51st IWCS, 2002, pp. 738-747

SUMMARY OF INVENTION

Patent Document 1 discloses that the generation of large water bubbles during immersion in hot water can be suppressed by using a monomer such as polypropylene glycol or poly tetramethylene glycol as an oligomer skeleton constituent component in a material for the primary coating layer. Meanwhile, Patent Document 2 discloses that the generation of large water bubbles during immersion in hot water can be suppressed by making the Tg (glass transition temperature) of the primary coating layer lower than the Tg of the secondary coating layer and making the thickness of the primary coating layer not larger than the thickness of the secondary coating layer. As described above, suppression of generation of water bubbles has been conventionally required to suppress the peeling at the glass/primary interface and to reduce the increase in transmission loss.

As a result of intensive studies, the present inventors have newly found that a non-uniform (uneven) distribution of the water bubbles formed in the primary coating layer during immersion in water is a cause of the peeling at the interface between the glass fiber and the primary coating layer and the increase in transmission loss. For this reason, the present invention employs an approach different from the conventional one in which the formation of water bubbles in the primary coating layer is suppressed during immersion in water. Specifically, in the approach employed in the present invention, the water resistance is improved by rather allowing water bubbles to be formed evenly in the primary coating layer during immersion in water.

An object of the present invention is to provide a coated optical fiber having such an excellent water resistance that the peeling at the interface between the glass fiber and the primary coating layer can be suppressed and the increase in transmission loss can be reduced by allowing water bubbles to be formed evenly in the primary coating layer during immersion in water.

An aspect of the present invention is a coated optical fiber comprising: an optical fiber including a glass fiber, a primary coating layer coating an outer periphery of the glass fiber, and a secondary coating layer coating an outer periphery of the primary coating layer; and a tertiary coating layer coating an outer periphery of the optical fiber and having an elastic modulus of 100 MPa or higher, wherein when the coated optical fiber is immersed in hot water at 60° C. for 200 days, water bubbles are formed substantially evenly inside the primary coating layer, a number of the water bubbles present per unit area in the primary coating layer on a cross-section taken along a longitudinal direction of the coated optical fiber is one or more, the unit area being defined with a thickness of the primary coating layer taken as one unit, and the water bubbles have diameters of 10 μm or less.

The coated optical fiber according to the present invention makes it possible to relax a stress by water bubbles because the water bubbles are formed substantially evenly inside the primary coating layer during immersion in water. Consequently, the peeling at the interface between the glass fiber and the primary coating layer can be suppressed and the increase in transmission loss can be reduced.

DESCRIPTION OF EMBODIMENTS

Hereinafter, embodiments of the present invention are described with reference to the drawings. However, the present invention is not limited to these embodiments. Note that, in the drawings described below, elements having the same functions are denoted by the same reference numerals, and overlapping descriptions thereof are omitted in some cases.

Embodiments

Figure 1:
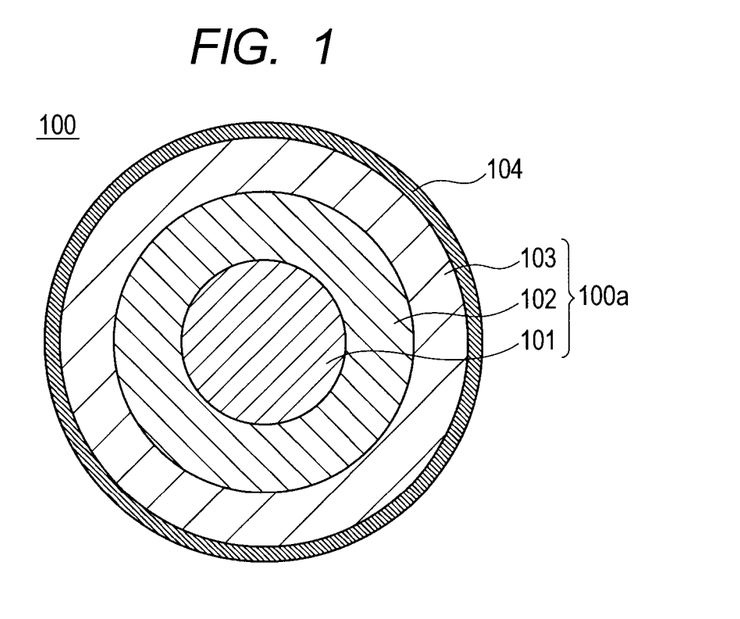
FIG. 1 is a schematic diagram of a coated optical fiber according to an embodiment of the present invention.

FIG. 1 shows a schematic diagram of a coated optical fiber 100 according to the present embodiment. Specifically, the coated optical fiber 100 includes: an optical fiber 100a including a glass fiber 101, a primary coating layer 102 coating an outer periphery of the glass fiber 101, a secondary coating layer 103 coating an outer periphery of the primary coating layer 102; and a colored layer 104 coating an outer periphery of the optical fiber 100a.

Each of the primary coating layer 102, the secondary coating layer 103, and the colored layer 104 is made from a coating material adjusted to have predetermined characteristics. As the coating material for each of the layers, an ultraviolet ray curable resin is used, in general. The ultraviolet ray curable resin contains at least an oligomer, a diluent monomer, and a photo-polymerization initiator, and further contains additives such as a silane coupling agent and a chain transfer agent for adjusting various properties.

Here, it is desirable that the coating materials of the layers be adjusted so that the primary coating layer 102 can have a low elastic modulus and the secondary coating layer 103 can have a high elastic modulus. In such a case, the primary coating layer 102 serves as a soft buffer layer, and the secondary coating layer 103 functions as a hard protective layer. Hence, increase in transmission loss can be suppressed even when an external force is applied to the optical fiber 100a. Specifically, in order to keep functions as an optical fiber, the elastic modulus of the primary coating layer 102 is preferably 0.2 to 3 MPa, the elastic modulus of the secondary coating layer 103 is preferably 500 to 1200 MPa, and the elastic modulus of the colored layer 104 is preferably 100 to 2000 MPa.

The coating material for the colored layer 104 is colored with a dye or a pigment for visibility. However, the colored layer 104 does not necessarily have to be colored, and a non-colored tertiary coating layer for strength retention and the like is also acceptable.

Recently, coated optical fibers of a type in which the primary coating layer 102 or the secondary coating layer 103 is colored with a dye or a pigment and the colored layer 104 is not provided for cost reduction are gaining popularity. In a case of coated optical fibers having such a two-layer structure, a ribbon coating layer used for forming an optical fiber ribbon by arranging the coated optical fibers in parallel to each other and coating the coated optical fibers together acts as the tertiary coating layer.

When a hard coating layer having an elastic modulus of 100 MPa or higher, such as the colored layer or the ribbon coating layer, exists on the outer periphery of the optical fiber 100a, the movement of the secondary coating layer is restrained, and the stress acting on an interface between the glass fiber and the primary coating layer increases, so that interface peeling becomes more likely to occur. Moreover, when a coated optical fiber is immersed in hot water for a long period, water may be accumulated in a peeled portion between the glass fiber and the primary coating layer. For this reason, particularly when a hard coating layer such as the colored layer or the ribbon coating layer exists outside the secondary coating layer, problems of the peeling at the interface between the glass fiber and the primary coating layer and the increase in transmission loss tend to arise particularly. Accordingly, a structure in which the tertiary coating layer having an elastic modulus of 100 MPa or higher coats the outer periphery of the secondary coating layer is a prerequisite for the present invention.

Note that soluble components in the coating layers are dissolved into water accumulated in the peeled portion between the glass fiber and the primary coating layer to form an aqueous solution. If a colored layer is present outside the secondary coating layer, the colored layer acts as a semi-permeable membrane. An osmotic pressure is generated because of the difference in concentration between the aqueous solution in the interlayer peeling portion and water outside the colored layer, and water moves to the interlayer peeling portion because of the osmotic pressure. As a result, the interlayer peeling may grow.

Hence, particularly the transmission loss may increase remarkably in a coated optical fiber having a colored layer.

In this embodiment, an ordinary value is employed for the size of each of the layers. Specifically, the glass fiber 101 has a diameter of 90 to 150 μm and preferably about 125 μm, each of the primary coating layer 102 and the secondary coating layer 103 has a thickness of 10 to 60 μm and preferably 20 to 50 μm, and the colored layer 104 has a thickness of 5 to 20 μm. The sizes of these layers are not limited to these values, and can be changed to any values.

Figure 2:
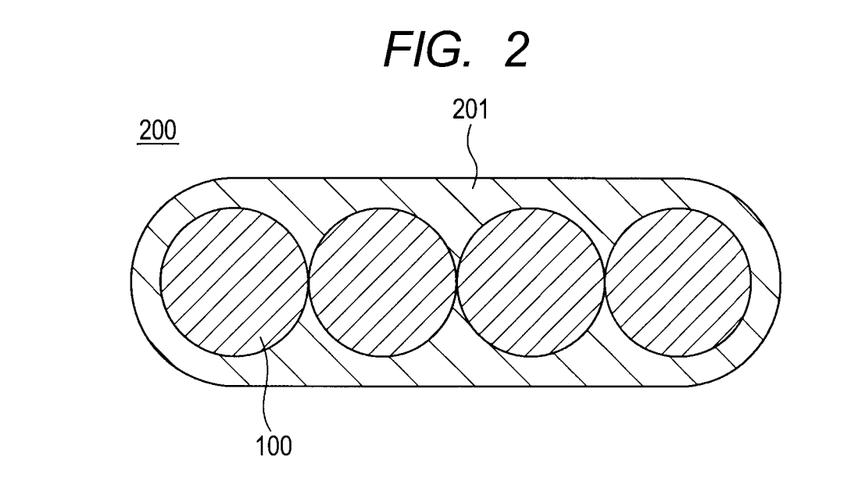
FIG. 2 is a schematic diagram of an optical fiber ribbon according to an embodiment of the present invention.

Multiple coated optical fibers 100 may be integrated into a tape shape. FIG. 2 shows a schematic diagram of an optical fiber ribbon 200 having such a structure. The optical fiber ribbon 200 has a structure in which the outside of four coated optical fibers 100 arranged in parallel to each other is coated with an ribbon coating layer 201. The ribbon coating layer 201 preferably has an elastic modulus of 100 to 2000 MPa from the viewpoints of strength retention and the like. The size of the optical fiber ribbon 200 is about 320 μm in thickness and 1.1 mm in width. The size of the optical fiber ribbon 200 and the number of the coated optical fibers 100 are not limited to these values, and may be changed to any values.

Note that the optical fibers 100a may be used instead of the coated optical fibers 100 to form the optical fiber ribbon 200. In such a case, the optical fiber ribbon 200 has a structure in which the outside of the secondary coating layers 103 of the optical fibers 100a is coated with an ribbon coating layer 201 serving as a tertiary coating layer.

Figure 3:
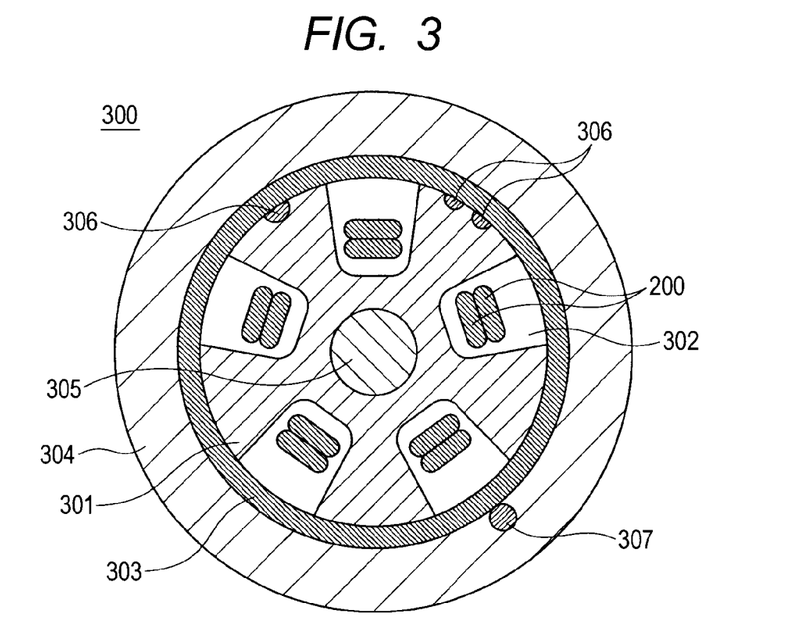
FIG. 3 is a schematic diagram of an optical fiber cable according to an embodiment of the present invention.

Moreover, an optical fiber cable may be formed by housing multiple optical fiber ribbons 200 in a slot. FIG. 3 shows a schematic diagram of an optical fiber cable 300 having such a structure. The optical fiber cable 300 is, for example, an SZ cable including 40 fibers. The optical fiber cable 300 includes a spacer 301 having five SZ slots 302. Two optical fiber ribbons 200 are housed in each of the SZ slots 302. A pressing and wrapping tape 303 is wound around the spacer 301, and the outside of the pressing and wrapping tape 303 is covered with a sheath 304. In addition, a tension member 305 is provided at a center in a cross section of the spacer 301. Tracer marks 306 are provided on an outer periphery of the spacer 301. A ripcord 307 is provided on a part of an outer periphery of the pressing and wrapping tape 303.

The SZ slots 302 are not limited to the five-grooved type, and the number of the groves can be selected as appropriate. Moreover, the number of the optical fiber ribbons 200 in each SZ slot 302 is not limited to two, but can be selected as appropriate. In addition, S slots may be used instead of the SZ slots.

(Method for Measuring Elastic Modulus)

As an index of the hardness of each of the coating layers, the elastic modulus (also referred to as Young's modulus) is used. The elastic modulus is measured for each of the coating layer after an optical fiber is fabricated. A well-known approach may be employed as a specific approach for measuring the elastic modulus.

(Method for Measuring Limit-Adhesion Strength)

A limit-adhesion strength is an index indicative of the adhesion strength of an interface between a glass fiber and a primary coating layer in a hot and humid environment. The limit-adhesion strength is defined as follows. Note that the definition of the limit-adhesion strength is based on the description in Patent Document 3.

A coated optical fiber whose coating layers are nicked over the entire periphery at a position 10 mm away from an end is prepared while only the glass fiber is left intact. Then, the coating layer in a region ranging from the end of the coated optical fiber to a position 10 mm away from the end is fixed to sandpaper by an adhesive agent. The sandpaper is fixed in an atmosphere of a temperature of 60° C. and a humidity of 98% RH with the end of the coated optical fiber located on the upper side. Then, a weight is attached to the other end of the coated optical fiber. Thus, a constant load is applied between the glass fiber and the primary coating layer in the portion extending above the nick over a length of 10 mm. In this state, the time taken until the glass fiber comes out of the primary coating layer is measured. Then, the load applied to the glass fiber, i.e., the mass of the weight is gradually changed, and the relationship between the load and the time taken until the glass fiber comes out is found.

Figure 4:
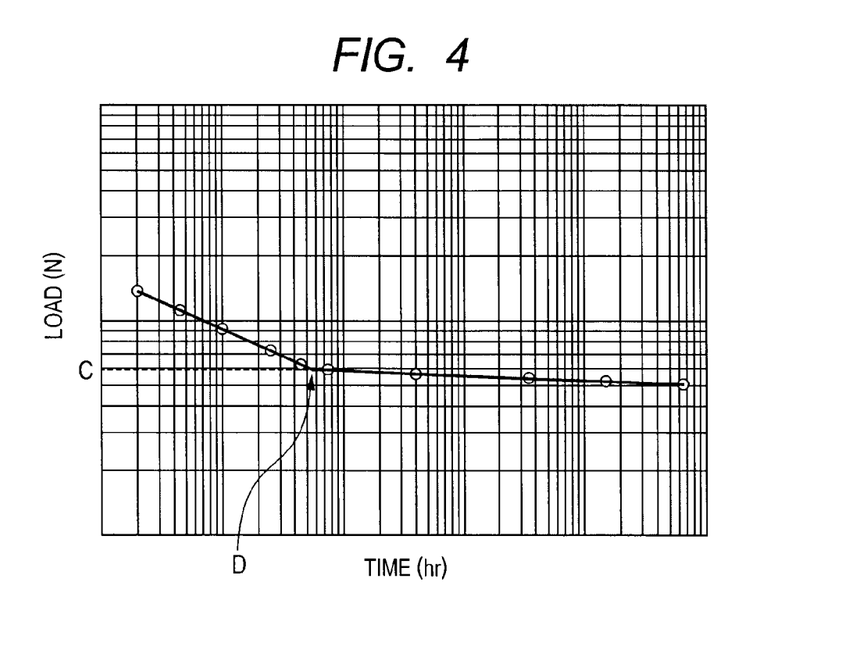
FIG. 4 is a graph showing the relationship between the load and the time taken until a glass fiber comes out of a primary coating layer.

FIG. 4 shows an example of a typical measurement result of the limit-adhesion strength. FIG. 4 is a graph shown as an example to help the definition of the limit-adhesion strength to be understood. Hence, it should be noted that FIG. 4 does not show a result of a specific example of this embodiment carried out and that specific numeric values on the vertical axis and the horizontal axis are omitted. Based on FIG. 4, as the load applied between the glass fiber and the primary coating layer decreases, the time taken until the glass fiber comes out of the primary coating layer increases. However, when the load reaches a load C or less, the time taken until the glass fiber comes out suddenly increases and the slope becomes gentle. An inflection point D exists at which the time taken until the glass fiber comes out suddenly increases and the slope becomes gentle as described above. The load C at the inflection point D at which the slope becomes gentle is defined as the limit-adhesion strength. Patent Document 3 shows that the higher the limit-adhesion strength is, the more the increase in transmission loss is reduced after immersion in hot water.

(Methods for Measuring D50 and T50)

In the present description, peeling at the glass/primary interface is referred to as delamination, and tearing inside the primary coating layer or void formation in the primary coating layer is referred to as tearing. Susceptibility to delamination and susceptibility to tearing are presumably associated with susceptibility to peeling at the glass/primary interface and susceptibility to water bubble formation. As quantitative indices of the susceptibility to delamination and the susceptibility to tearing, D50 and T50 are defined as follows, respectively.

Figure 5:
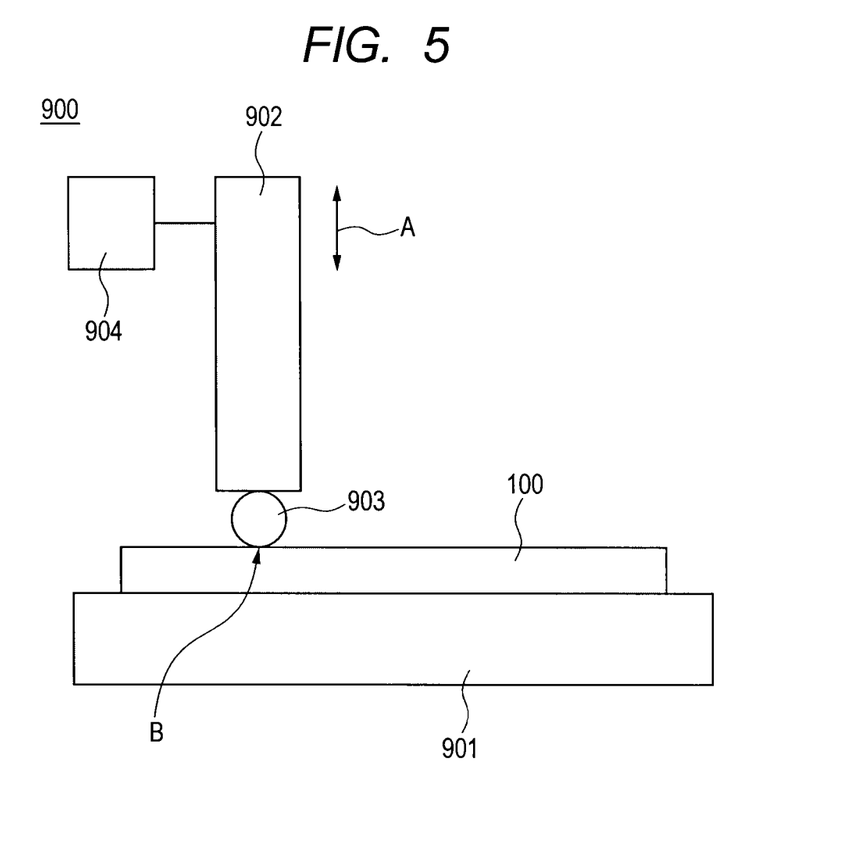
FIG. 5 is a schematic diagram of a load testing apparatus used for conducting a load test.

FIG. 5 shows a schematic diagram of a load testing apparatus 900 as an example of an apparatus for measuring the delamination and the tearing. The load testing apparatus 900 includes a stage 901 on which a coated optical fiber 100 to be measured is to be mounted, a load unit 902 being provided away from the stage 901 and capable of adjusting the value of the load, a rod 903 fixed to the load unit 902 on the stage 901 side, and a driving unit 904 capable of moving the load unit 902 and the rod 903 in a normal line direction A of the stage 901. The rod 903 is provided to be perpendicular to the longitudinal direction of the coated optical fiber 100 in a state of being mounted on the stage 901 and in parallel to a surface of the stage 901.

When the driving unit 904 releases the load unit 902, the load unit 902 and the rod 903 move by their own weights toward the stage 901. The rod 903 and the stage 901 sandwiches the coated optical fiber 100, and the load unit 902 applies a load to a point B on the coated optical fiber 100. After that, after a predetermined time has elapsed, the driving unit 904 moves the load unit 902 and the rod 903 in the direction away from the coated optical fiber 100, and the load unit 902 does not apply a load to the coated optical fiber 100 anymore.

Note that the start and the end of the application of the load may be controlled manually by a user or may be conducted automatically by providing a control unit. The measuring apparatus is not limited to that having the apparatus structure of FIG. 5, as long as a predetermined load can be applied for a predetermined time to a point B of the coated optical fiber 100 in a direction perpendicular to the longitudinal direction of the coated optical fiber.

For the measurement, a coated optical fiber 100 to be measured is fixed to the load testing apparatus 900. Then, a predetermined load is applied to a point for 4.5 seconds, and further the load is applied repeatedly to 30 points at intervals of approximately 6 mm. After that, the presence or absence of delamination or tearing is observed for each of the points with an optical microscope. Moreover, the load is increased, and application of the load to 30 points different from those in the prior observation and observation of the points are repeated every time the load is increased. Based on this, the value of the load and the number of points where the delamination or tear occurs are plotted against each other. Note that the points to which the load is applied is not limited to 30.

A smallest load with which delamination or tearing is observed at 50% or more of all the points to which the load is applied is defined as D50 or T50. In other words, in the plot, a smallest load with which delamination is observed at 50% (15 points) or more of the 30 points to which the load is applied is defined as D50. Meanwhile, in the plot, a smallest load with which tearing is observed at 50% (15 points) or more of the 30 points to which the load is applied is defined as D50.

It can be said that a smaller D50 indicates that a smaller load is required to cause delamination, i.e., a smaller D50 indicates a higher susceptibility to delamination. Likewise, it can be said that a smaller T50 indicates that a smaller load is required to cause tearing, i.e., a smaller T50 indicates a higher susceptibility to tearing. Hence, D50 and T50 can be used as indices of susceptibilities to delamination and tearing, respectively.

Note that these measuring methods are based on the methods described in Non Patent Document 1.

(Sample Adjustment)

Conventionally, the generation of water bubbles in the primary coating layer during immersion in water itself has been thought to be a cause of the increase in transmission loss as shown in Patent Documents 1 and 2. Meanwhile, the present inventors have conducted intensive study and consequently have newly found that a non-uniform distribution of water bubbles formed in the primary coating layer during immersion in water is a cause of the peeling at the interface between the glass fiber and the primary coating layer and the increase in transmission loss.

It is conceivable that when water bubbles are not formed or unevenly formed in the primary coating layer during immersion in water, the peeling easily occurs because a stress from the secondary coating layer is transmitted directly to the glass/primary interface or is transmitted in a concentrated manner on some regions. On the other hand, it is conceivable that when water bubbles are formed evenly in the primary coating layer during immersion in water, the stress from the secondary coating layer is relaxed by the uniformly distributed water bubbles, so that the peeling at the glass/primary interface is suppressed.

Hence, when the materials of the coated optical fiber are adjusted so that water bubbles can be formed evenly in the primary coating layer, a force is applied evenly to the glass/primary interface, and consequently the suppression of the peeling and the reduction of transmission loss can be achieved without reduction of the number of water bubbles generated during immersion in water.

In order that water bubbles can be formed evenly in the primary coating layer during immersion in hot water, the material of each coating layer is adjusted as follows.

The present inventors have found that water bubbles are formed evenly in the primary coating layer during immersion in hot water by making the tearing more likely to occur than the delamination, so that the increase in transmission loss can be reduced. When the tearing is more likely to occur than the delamination, in other words, when the D50 is greater than the T50, a stress from the secondary coating layer causes formation of water bubbles inside the primary coating layer before delamination during immersion in hot water. Presumably, as a result of this, the stress is relaxed by the water bubbles, so that the increase in transmission loss can be reduced.

To make the delamination less likely to occur (i.e., to increase the D50), an external force transmitted to the glass/primary interface is relaxed by decreasing the elastic modulus of the primary coating layer and increasing the elastic modulus of the secondary coating layer. Alternatively, the adhesion strength between the surface of the glass fiber and the primary coating layer is increased by adding an additive such as a silane coupling agent, for example, to the material of the primary coating layer.

To make the tearing more likely to occur (i.e., to decrease the T50), the elastic modulus of the primary coating layer is decreased, i.e., the crosslink density of the primary coating layer is decreased.

Moreover, to distribute water bubbles evenly in the primary coating layer, it is possible to prevent water bubbles from being formed locally by using a hydrophobic oligomer such as polytetramethylene glycol (PTMG) as a material for the primary coating layer and to adjust water absorption by adding a hydrophilic monomer such as acrylamide.

Accordingly, a coated optical fiber in which water bubbles are formed evenly in the primary coating layer during immersion in hot water can be obtained by conducting, in an integrated manner, the adjustment of the materials for the coating layers so that the D50 and the T50 can take predetermined values and the adjustment of the mixing ratio of the hydrophobic substance and the hydrophilic substance in the material for the primary coating layer so that water bubbles can be distributed uniformly.

Examples

Examples 1 to 4 and Comparative Examples 1 to 3 were prepared which were optical fiber ribbons having the structure shown in FIG. 2 and among which properties of the coating layers were varied. The coated optical fibers were taken out from the optical fiber ribbons, and the above-described elastic modulus, D50, T50, and limit-adhesion strength were measured. In addition, the transmission loss before immersion in hot water was measured by using the optical fiber ribbons.

In addition, Examples and Comparative Examples were immersed in hot water at 60° C. for 200 days, and then the water bubbles were observed and the transmission loss was measured. Table 1 shows the results of the observation and measurement carried out.

TABLE 1

| Number | Example | | | | Comparative Example | | |
|---|---|---|---|---|---|---|---|
| | 1 | 2 | 3 | 4 | 1 | 2 | 3 |
| Elastic modulus of primary coating layer (MPa) | 0.4 | 0.5 | 0.7 | 0.4 | 0.5 | 0.3 | 0.5 |
| Elastic modulus of secondary coating layer (MPa) | 700 | 800 | 1000 | 1000 | 600 | 800 | 600 |
| Elastic modulus of tertiary coating layer (MPa) | 800 | 800 | 800 | 800 | 800 | 800 | 800 |
| D50 (g) | 550 | 550 | 550 | 1000 | 200 | 550 | 550 |
| T50 (g) | 200 | 300 | 450 | 800 | 200 | 550 | 150 |
| Limit-adhesion strength (N) | 0.8 | 0.8 | 1.0 | 0.6 | 0.5 | 0.5 | 1.0 |

TABLE 1-continued

|  | Example | | | | Comparative Example | | |
| --- | --- | --- | --- | --- | --- | --- | --- |
| Number | 1 | 2 | 3 | 4 | 1 | 2 | 3 |
| Presence or absence of delamination | Absent | Absent | Absent | Absent | Present | Absent | Absent |
| Maximum number of fine bubbles (number of bubbles) | >10 | >10 | 8 | >10 | 0 | 0 | >10 |
| Minimum number of fine bubbles (number of bubbles) | 1 | 5 | 3 | 7 | 0 | 0 | 1 |
| Maximum diameter of fine bubbles (μm) | 10 | 7 | 6 | 3 | — | — | >10 |
| Increase in transmission loss (db/km) | 0.095 | 0.03 | 0.06 | 0.05 | 0.2 | 0.12 | 0.15 |
| Evaluation | B | A | A | A | C | C | C |

Examples and Comparative Examples immersed in hot water at 60° C. for 200 days were each observed with an optical microscope for the presence or absence of generation of delamination at the glass/primary interface, the number of water bubbles (fine bubbles), and the sizes of the water bubbles.

Specifically, after the immersion in hot water, an approximately 10-cm piece was cut out of the coated optical fiber. Then, three points (3 cm, 6 cm, and 9 cm) away from an end of the coated optical fiber at intervals of approximately 3 cm were observed. Further, the coated optical fiber was rotated by 90 degrees in the circumferential direction of the cross-section, and the three points were observed again. In each of the six observation points described above, the presence or absence of generation of the delamination and the number and the sizes of the water bubbles were observed and measured in a direction perpendicular to the longitudinal direction of the coated optical fiber in an area of 30 μm in the thickness direction and 30 μm in the longitudinal direction in the primary coating layer (since the thickness of the primary coating layer is 30 μm, this area is referred to as a unit area defined with the thickness of the primary coating layer being taken as one unit). This measurement makes it possible to determine whether or not the water bubbles are evenly formed not only in the longitudinal direction of the coated optical fiber but also in the circumferential direction of the cross-section.

As for the presence or absence of the delamination, the delamination was determined to be present if one or more delaminations at the glass/primary interface occurred at any of the six observation points, and the delamination was determined to be absent if no delamination occurred.

The maximum number of fine bubbles represents the largest number of water bubbles among those observed at the six observation points. Meanwhile, the minimum number of fine bubbles represents the smallest number of water bubbles among those observed at the six observation points. In a case where the number of water bubbles was greater than 10, the maximum number is expressed as ">10".

The maximum diameter of fine bubbles represents the diameter of the largest water bubble in the six observation points. Note that when the water bubble had an elliptical shape, the longest distance passing through the center of the water bubble was employed as the diameter of the water bubble. When the diameter of the water bubble was larger than 10 μm, the maximum diameter is expressed as ">10".

The transmission loss of each of Examples and Comparative Examples was measured before and after the immersion in hot water. The increase in transmission loss was an increment in transmission loss between that measured by using the coated optical fiber after the immersion in hot water at 60° C. for 200 days and that measured by using the coated optical fiber before the immersion in hot water. For the measurement of the transmission losses, light with a wavelength of 1.55 μm was used.

In general, an increase in transmission loss of less than 0.1 dB/km is regarded as being acceptable in a practical sense. For this reason, if the increase was 0.1 dB/km or more, the water resistance was evaluated to be insufficient (this evaluation was represented by C); if the increase was less than 0.1 dB/km, the water resistance was evaluated to be sufficient (this evaluation was represented by B); and further if the increase was less than 0.07 dB/km, the water resistance was evaluated to be excellent (this evaluation was represented by A).

From the results shown in Table 1, it can be seen that the increase in transmission loss was reduced more in the cases (Examples 1 to 4) where one or more water bubbles were generated than in the cases (Comparative Examples 1 and 2) where water bubbles were not generated. Moreover, in the case (Comparative Example 1) where water bubbles were not formed, generation of delamination was also observed.

In addition, among the cases where one or more water bubbles were generated, the increase in transmission loss was reduced more in the cases (Examples 1 to 4) where the maximum diameter of the water bubbles was 10 μm or smaller than in the case (Comparative Example 3) where the maximum diameter of the water bubbles was larger than 10 μm.

From the fact that at least one water bubble was generated at all the points observed, it can be said that the water bubbles were formed substantially evenly in the primary coating layer. Hence, it is conceivable that the stress from the secondary coating layer to the glass/primary interface was relaxed by the generation of small water bubbles substantially evenly in the primary coating layer during the immersion in hot water at 60° C. for 200 days, so that the increase in transmission loss was reduced. Specifically, the increase in transmission loss was reduced when the water bubbles were formed substantially evenly in the primary coating layer, the sizes of the water bubbles were 10 μm or less in diameter, and the number of the water bubbles present per unit area on the cross-section taken along the longitudinal direction of the primary coating layer was one or more. By taking the thickness of the primary coating layer as one unit, the unit area is defined as an area equal to the square of the thickness of the primary coating layer.

In addition, from the results shown in Table 1, it can be seen that the increase in transmission loss was reduced in the cases (Examples 1 to 4) where the D50 was larger than the T50. On the other hand, the increase in transmission loss increased in the case (Comparative Example 3) where the T50 was smaller than 200 g. This is presumably because too small a T50 made the water bubbles more likely to be formed in the primary coating layer, and the water bubbles aggregated to form larger water bubbles, so that the stress was applied unevenly to the glass/primary interface, resulting in the increase in transmission loss. For this reason, it is more preferable that the D50 be 500 g or higher and the T50 be 200 g or higher.

The invention claimed is:

1. A coated optical fiber comprising:
an optical fiber including a glass fiber, a primary coating layer coating an outer periphery of the glass fiber, and a secondary coating layer coating an outer periphery of the primary coating layer; and
a tertiary coating layer coating an outer periphery of the optical fiber and having an elastic modulus of 100 MPa or higher, wherein
when the coated optical fiber is immersed in hot water at 60° C. for 200 days, water bubbles are formed substantially evenly inside the primary coating layer,
when the primary coating layer of the coated optical fiber is observed in each of six observation points at three points at intervals of approximately 3 cm along a longitudinal direction of the coated optical fiber before and after a rotation of the coated optical fiber by 90 degrees in a circumferential direction of a cross-section perpendicular to the longitudinal direction, a number of the water bubbles present per unit area in the primary coating layer is one or more at minimum and eight or more at maximum, the unit area being defined with a thickness of the primary coating layer being taken as one unit, and the water bubbles have diameters of 10 μm or less at maximum, in the six observation points,
each of the primary coating layer, the secondary coating layer, and the tertiary coating layer is made of an ultraviolet ray curable resin, the ultraviolet ray curable resin containing an oligomer, a diluent monomer, a photo-polymerization initiator, and an additive including a silane coupling agent,
an elastic modulus of the primary coating layer is 0.2 to 0.7 MPa and an elastic modulus of the secondary coating layer is 500 to 1200 MPa,
a first load which causes delamination at a 50% probability when applied to the coated optical fiber in a direction perpendicular to the longitudinal direction of the coated optical fiber is larger than a second load which causes tearing at a 50% probability when applied to the coated optical fiber in the direction perpendicular to the longitudinal direction of the coated optical fiber, and
the first load is 500 g or more, and the second load is 200 g or more.

2. The coated optical fiber according to claim 1, wherein the tertiary coating layer is a colored layer.

3. An optical fiber ribbon comprising: a plurality of the coated optical fibers according to claim 2 arranged in parallel to each other and coated together.

4. An optical fiber cable comprising: a plurality of the optical fiber ribbons according to claim 3 stacked on each other; and a slot in which the optical fiber ribbons are housed.

5. The coated optical fiber according to claim 1, wherein a limit-adhesion strength which is a loading at an inflection point in a relationship between a given loading to pull out the glass fiber from the coating layers and a time taken for the glass fiber to be pulled out from the coating layers by the given loading in a hot and humid environment of 60° C. and 98% RH humidity is 0.6N or more and 1.0N or less, the limit-adhesion strength being defined by providing a sample which is cut out of the optical fiber; making a cut around the coating layers at a position of 10 mm away from one end of the sample; fixing a region of the sample from the one end to the cut on a sand paper using an adhesive agent; and attaching a weight of the given loading to another end of the sample.

6. The coated optical fiber according to claim 1, wherein the elastic modulus of the secondary coating layer is 700 to 1200 MPa.

7. The coated optical fiber according to claim 1, wherein the primary coating layer includes a hydrophobic oligomer and a hydrophilic monomer.

8. The coated optical fiber according to claim 7, wherein the hydrophobic oligomer is polytetramethylene glycol and the hydrophilic monomer is acrylamide.

9. An optical fiber ribbon comprising:
a plurality of optical fibers each of which includes a glass fiber, a primary coating layer coating an outer periphery of the glass fiber, and a secondary coating layer coating an outer periphery of the primary coating layer and which are arranged in parallel to each other; and
a ribbon coating layer being a tertiary coating layer having an elastic modulus of 100 MPa or higher and coating the optical fibers together, wherein
when the optical fiber ribbon is immersed in hot water at 60° C. for 200 days, water bubbles are formed substantially evenly inside the primary coating layer,
when the primary coating layer of one of the optical fibers is observed in each of six observation points at three points at intervals of approximately 3 cm along a longitudinal direction of the one of the optical fibers before and after a rotation of the one of the optical fibers by 90 degrees in a circumferential direction of a cross-section perpendicular to the longitudinal direction, a number of the water bubbles present per unit area in the primary coating layer is one or more at minimum and eight or more at maximum, the unit area being defined with a thickness of the primary coating layer being taken as one unit, and the water bubbles have diameters of 10 μm or less at maximum, in the six observation points,
each of the primary coating layer, the secondary coating layer, and the tertiary coating layer is made of an ultraviolet ray curable resin, the ultraviolet ray curable resin containing an oligomer, a diluent monomer, a photo-polymerization initiator, and an additive including a silane coupling agent,
an elastic modulus of the primary coating layer is 0.2 to 0.7 MPa and an elastic modulus of the secondary coating layer is 500 to 1200 MPa,
a first load which causes delamination at a 50% probability when applied to the coated optical fiber in a direction perpendicular to the longitudinal direction of the coated optical fiber is larger than a second load which causes tearing at a 50% probability when applied to the coated optical fiber in the direction perpendicular to the longitudinal direction of the coated optical fiber, and
the first load is 500 g or more, and the second load is 200 g or more.

10. An optical fiber cable comprising: a plurality of the optical fiber ribbons according to claim 9 stacked on each other; and a slot in which the optical fiber ribbons are housed.

11. The optical fiber ribbon according to claim 9, wherein a limit-adhesion strength which is a loading at an inflection point in a relationship between a given loading to pull out the glass fiber from the coating layers and a time taken for the glass fiber to be pulled out from the coating layers by the given loading in a hot and humid environment of 60° C. and 98% RH humidity is 0.6N or more and 1.0N or less, the limit-adhesion strength being defined by providing a sample which is cut out of the optical fiber; making a cut around the coating layers at a position of 10 mm away from one end of the sample; fixing a region of the sample from the one end to the cut on a sand paper using an adhesive agent; and attaching a weight of the given loading to another end of the sample.

12. The optical fiber ribbon according to claim 9, wherein the elastic modulus of the secondary coating layer is 700 to 1200 MPa.

13. The optical fiber ribbon according to claim 9, wherein the primary coating layer includes a hydrophobic oligomer and a hydrophilic monomer.

14. The optical fiber ribbon according to claim 13, wherein the hydrophobic oligomer is polytetramethylene glycol and the hydrophilic monomer is acrylamide.

* * * * *